(No Model.)

G. L. EASON.
HARNESS ATTACHMENT.

No. 320,546. Patented June 23, 1885.

Witnesses:
R. H. Orwig.
M. A. Anderson.

Inventor:
George L. Eason,
By Thomas C. Orwig, Atty.

UNITED STATES PATENT OFFICE.

GEORGE L. EASON, OF DES MOINES, IOWA, ASSIGNOR OF ONE-HALF TO R. I. SCOTT, OF SAME PLACE.

HARNESS ATTACHMENT.

SPECIFICATION forming part of Letters Patent No. 320,546, dated June 23, 1885.

Application filed April 13, 1885. (No model.)

*To all whom it may concern:*

Be it known that I, GEORGE L. EASON, a citizen of the United States of America, and a resident of Des Moines, in the county of Polk and State of Iowa, have invented a harness attachment to protect driving-reins from a horse's tail, of which the following is a specification.

My object is to prevent the annoyances, dangers, and accidents incident to a horse switching his tail and getting the reins under it while driving in fly-time; and my invention consists in the construction and combination of a guard with a harness, as hereinafter fully set forth, in such a manner that the guard will be operated by the movements of the animal's tail as required, to prevent the reins from getting under the tail or from being jerked out of the hands of the driver by the switching of the tail.

Figure 1:
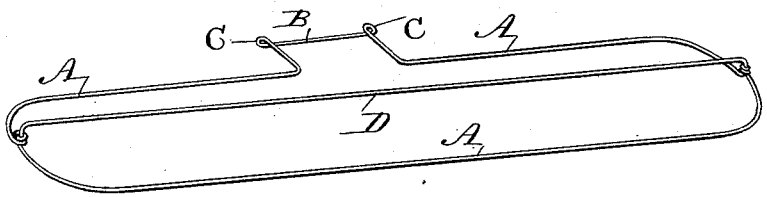
Figure 2:
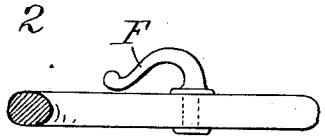
Figure 3:
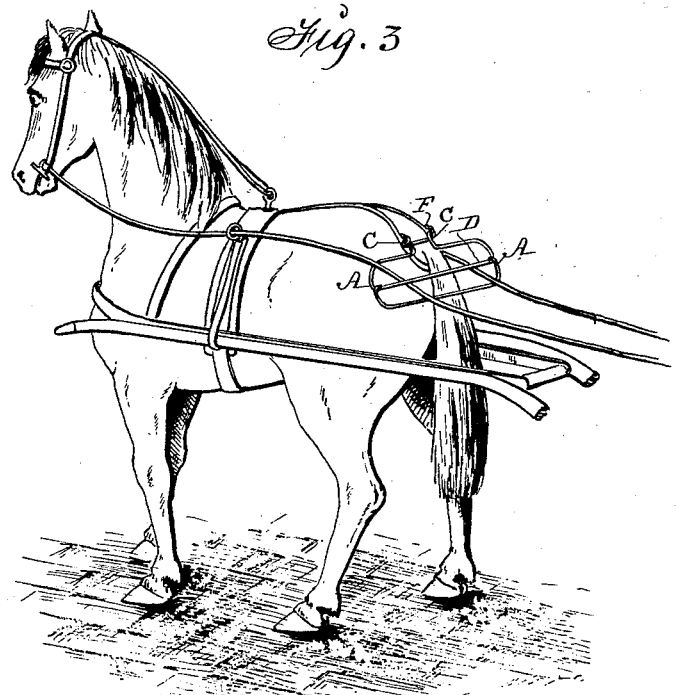

Figure 1 of the accompanying drawings is a plan view of my attachment. Fig. 2 is a section of harness having a hook adapted to engage and retain the attachment in proper position on a horse. Fig. 3 is a perspective view showing my attachment applied as required for practical use. Together these figures clearly illustrate the construction, application, operation, and utility of my complete invention.

A is the main portion of the guard, in the form of an elongated frame, made of wire, and, preferably, in the shape of an ellipse. B is a lateral extension at the center, which has eyes C at its corners, adapted to engage hooks or other suitable fastening devices fixed to the harness.

D is a wire fixed to the ends of the frame A, to extend through its center and to connect the reins with the attachment. It has short upward bends at its ends that elevate it to allow the reins to pass under it. In place of making the bar D of a separate piece, it may be integral with the frame A.

F (shown clearly in Fig. 2) represents a fastening device in the form of a hook, fixed to a section of a crupper. One of these hooks or other suitable device is fixed to each branch of a crupper in such a manner that they will engage the eyes C of the complete guard to flexibly connect it with the harness, as required, to retain it in a horizontal position and immediately over the root of a horse's tail.

When the guard is thus combined with a harness on a horse, I pass the driving-reins backward under the center wire, D, of the guard, to combine the reins with the device in such a manner that when the horse switches his tail he will lift the guard, and thereby the reins, and prevent them from getting in contact with the tail, to be pulled out of the driver's hands, or to be in any way held or interfered with by the movements of the tail.

I claim as my invention—

1. As an improved article of manufacture, an attachment for harness, composed of an elongated wire frame having an extension at its front and center that is provided with eyes at its corners, and a bar or wire extending through the center of the frame from its opposite ends, for the purposes stated.

2. The combination of the guard composed of the elongated frame A, having a lateral extension, B, eyes C, and a central part, D, with the crupper of a harness, having hooks F, or their equivalents, substantially as shown and described, to operate in the manner set forth, for the purposes stated.

GEORGE L. EASON.

Witnesses:
S. M. LOMBARD,
M. H. SMITH.